United States Patent [19]

Lungu

[11] Patent Number: 5,394,131
[45] Date of Patent: Feb. 28, 1995

[54] MAGNETIC DRIVE WITH A PERMANENT-MAGNET ARMATURE

[76] Inventor: Cornelius Lungu, Rossbuhlstrasse 11, D-7582, Buhlertal, Germany

[21] Appl. No.: 862,767

[22] PCT Filed: Dec. 21, 1990

[86] PCT No.: PCT/EP90/02276
§ 371 Date: Jun. 22, 1992
§ 102(e) Date: Jun. 22, 1992

[87] PCT Pub. No.: WO91/10242
PCT Pub. Date: Jul. 11, 1991

[30] Foreign Application Priority Data

Dec. 22, 1989 [DE] Germany ............... 3942542

[51] Int. Cl.$^6$ ............................................. H01F 7/00
[52] U.S. Cl. ................................. 335/229; 335/219; 335/232; 335/234; 335/243; 335/255; 335/259; 335/261; 335/265; 335/272; 335/279; 335/281; 310/20; 310/92; 251/129.01; 251/129.02; 361/160
[58] Field of Search ........... 335/179, 219, 229–234, 335/238, 243, 244, 246, 247, 248, 249, 250, 251, 253, 255, 257, 259, 261, 265, 270, 272, 274, 279, 281; 310/20, 92; 251/129.01, 129.02; 361/156, 160

[56] References Cited

U.S. PATENT DOCUMENTS

| | | | |
|---|---|---|---|
| 3,203,447 | 8/1965 | Bremner et al. | 335/229 |
| 3,379,214 | 4/1968 | Weinberg | 335/229 |
| 4,422,060 | 12/1983 | Matsumoto et al. | 335/256 |
| 4,494,098 | 1/1985 | Haneda et al. | 335/230 |
| 4,779,582 | 8/1987 | Lequesne . | |

FOREIGN PATENT DOCUMENTS

| | | |
|---|---|---|
| 0081605 | 12/1981 | European Pat. Off. . |
| 7916946 | 6/1979 | France . |
| 1068610 | 5/1964 | United Kingdom . |
| 2175452 | 4/1986 | United Kingdom . |

Primary Examiner—Leo P. Picard
Assistant Examiner—R. Barrera
Attorney, Agent, or Firm—Diller, Ramik & Wight

[57] ABSTRACT

The invention concerns a bistable magnetic drive with an assembled armature 3, 4 consisting of a high-grade, disk-shaped permanent magnet 3 with two appropriately shaped pole pieces 4,4' and displaceable sideways off the coil 1 transversely to its axis inside an electromagnetic annular pole-piece Rp between two electromagnetic stop pole-pieces 5, 5'. The invention describes illustrative embodiments and applications of this drive as an excursion and oscillating magnet, further a circuit for DC operation. A capacitor circuit furthermore allows mono-stable operation. The advantages are a lightweight armature, high efficiency, bilateral operation, versatility and simplicity.

43 Claims, 7 Drawing Sheets

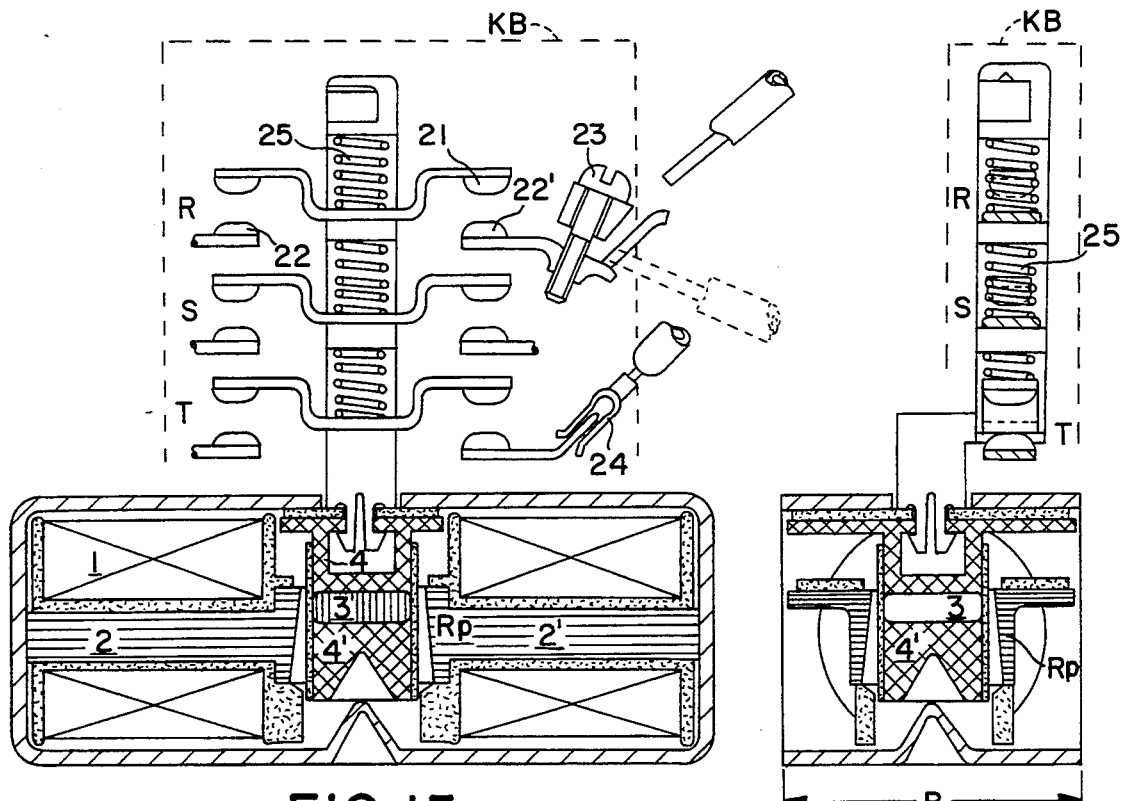
FIG. 15
FIG. 16
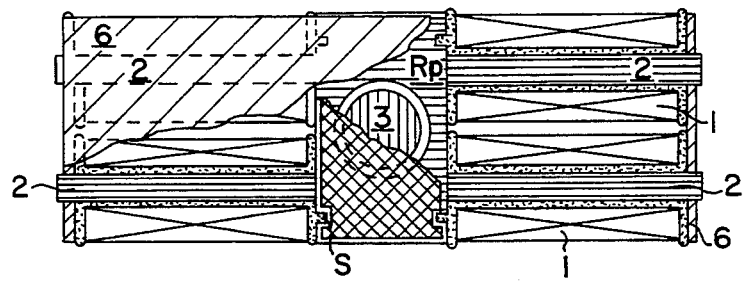
FIG. 17
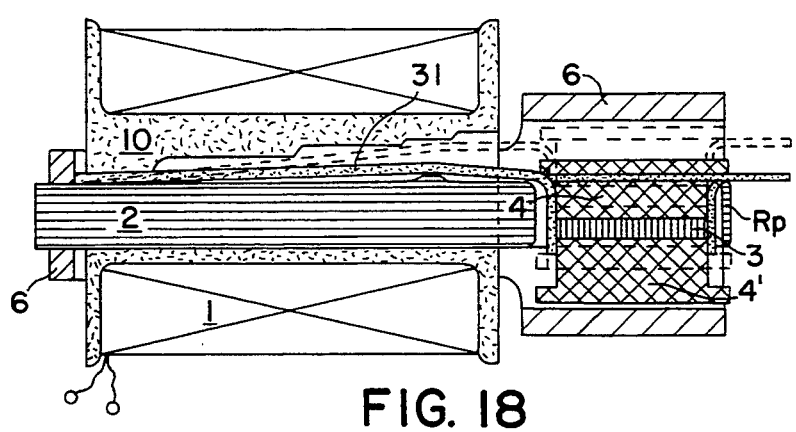
FIG. 18

MAGNETIC DRIVE WITH A PERMANENT-MAGNET ARMATURE

BACKGROUND OF THE INVENTION

The invention concerns a magnetic drive with at least one armature magnetized in the direction of excursion and consisting of a permanent magnet with two magnetically soft pole pieces, said armature being movable along a common axis between two electromagnetic external pole-pieces which are magnetizable always with the same polarity and are axially located inside a passage of a third electromagnet that is present between the external pole-pieces and that can be controlled with a magnetic polarity that is opposite that of the said external pole-pieces, the central annular pole-piece comprising passages and/or the external pole-pieces projecting from a coil wound on a magnetically soft core.

Such a magnetic drive is known from the British patent 1,068,610.

The state of the art contains moreover numerous magnetic drives with armatures made of permanent magnetic materials and displaceable between two pole-pieces of the same sign. Essentially the basic designs of simple magnetic circuits of this sort have been exhausted. However there are almost no reliable practical computation methods or design criteria, and this kind of magnetic drive so far has found little acceptance, in considerable part because of mechanical inadequacies, the use of earlier magnetic materials of lower performance.

The German Offenlegungsschrift 34 26 688 discloses a magnetic drive of the above species with two cylindrical, coaxial and sequentially mounted coils and a permanent-magnet armature which is displaceable centrally in the axial direction inside the coil bore. This arrangement of two coils hardly allows mounting operational devices at the magnetic armature for lack of adequate space inside the coil bore. Moreover there is danger of the magnetic armature heating on account of the unfavorable position and thereby losing its permanent field strength.

SUMMARY OF THE INVENTION

The object of the invention is to create a novel and especially simple magnetic drive with appropriate design criteria that shall take into account the high performance together with the unfavorable mechanical properties of modern permanent magnetic materials and that is suitable for miniaturization with minimal armature weights and manifold applications.

The problem is solved by the features of the characterizing part of claim 1.

Advantageous embodiments of the invention are stated in the sub-claims.

The bistable character of the described magnetic drive allows energizing them with short current pulses. These pulses may be generated for instance by charging and discharging a capacitor or an inductive-capacitive coil such as known from the German Offenlegungsschrift 36 04 579. Suitable circuits of this kind with energy storage furthermore permit imparting monostable behavior to the magnetic drive.

Illustrative embodiments of the invention are schematically shown in the drawing.

BRIEF DESCRIPTION OF THE DRAWINGS

FIG. 15 is an illustrative application of the magnetic drive of FIGS. 12 or FIG. 14 as electromagnetic contactors, FIG. 16 is a sideview of FIG. 15, FIG. 17 shows the arrangement of several part-coils around the armature of a magnetic drive, and FIG. 18 is an illustrative embodiment of the magnetic drive with a lamellar spring mounted inside the coil.

DESCRIPTION OF THE PREFERRED EMBODIMENTS

Figure 1A:
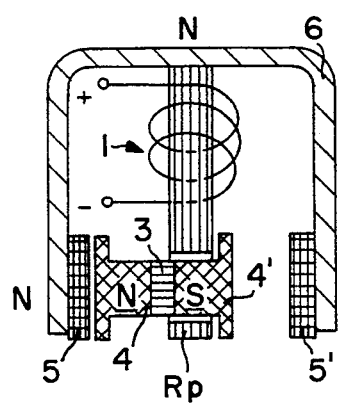
FIGS. 1a–1d show the magnetic drive in simplified form with the armature in various positions, and the forces acting on the armature.

As shown by FIG. 1, the magnetic drive comprises a coil 1 wound around a magnetic core 2. The magnetic core 2 consists of a magnetically soft material and ends downward in a flattened zone with a passage, hereafter called the annular pole-piece Rp. This annular pole-piece projects from the coil and always is of the magnetic polarity of the lower coil side. An armature is mounted inside the annular pole-piece Rp and can be displaced horizontally, that is transversely to the coil axis. The armature consists of a thin, mostly lamellar permanent magnet 3 magnetized in the axial direction and located between two pole pieces 4, 4' consisting of a magnetically soft material and always assuming the polarity of the poles of the permanent magnet 3. As shown, the pole piece 4 always is N and the right one always is S in polarity.

The permanent magnet 3 consists of a high-grade magnetic material such as SmCo or FeNdB and, in the sense of the invention, must evince an energy product BHmax of at least 100 kJ/m$^3$ at a remanent induction $B_H$ of at least 0.7 T, where

| | |
|---|---|
| B | induction |
| Br | residual induction |
| H | coercive field strength |
| kJ/m$^3$ | kilojoules per cubic meter |
| Reluctance | impedance of magnetic circuit. |

The height of the permanent magnet 3 is limited to about half its diameter. Using lower-grade permanent-magnet materials would entail substantially higher bulk and weight of the armature at lesser efficiency, besides other drawbacks. This is explicable by the need of larger annular pole-piece which did lead to more "shorting field lines" between the also larger stop pole-pieces and the annular pole-piece.

The armature 3, 4 cooperates magnetically with the annular pole-piece Rp and two magnetically soft stop pole-pieces 5, 5' each of the polarity of the upper coil side, that is, with a current in the coil, these pole pieces 5, 5' evince a polarity opposite that of the annular pole-piece Rp. To achieve this effect, the magnetic circuit from the stop pole-pieces 5, 5' to the upper end of the magnetic core 2 is closed by a magnetically soft return yoke 6.

To elucidate the invention, the magnetic core 2 with the annular pole-piece Rp is shaded vertically and the permanent magnet 3 is shaded horizontally. The pole pieces 4 are shaded crosswise at 45°, the stop pole-pieces 5 are shaded vertically-horizontally and the return yoke 6 is shown with a single shading at 45°.

Those parts that do not act magnetically and accordingly are made of a non-magnetic material and which are shown in the applicable drawings (as part of an operational device) are shown dotted in cross-section or in bold black lines.

Figure 1B:
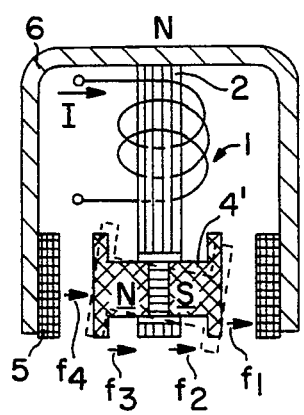
Figure 1C:
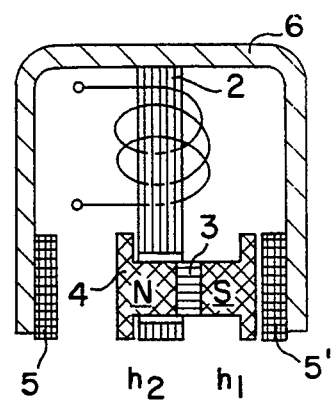

FIGS. 1a through 1c elucidate the magnetic processes of the magnetic drive with the armature in three positions: left and right in the stable rest position and centrally in an unstable transitional position. The armature 3, 4 is able to move between the lateral stop pole-pieces 5. The distance between the stop pole-pieces 5, 5' less the armature length is the excursion which is shown in FIG. 1d on an enlarged scale as the distance between the left and right vertical axes.

The forces in the corresponding stop positions are plotted as ordinates on said axes. If the actuation force is plotted as y above the horizontal abscissa, then the characteristic curves of the forces determining the drive function can be ascertained.

With current in coil 1 (FIG. 1a), the S polarity will be generated at the annular pole-piece Rp of the magnetic core 2 and the polarity N above the coil 1, said polarity N being communicated to the lateral stop pole-pieces 5, 5'.

Figure 1D:
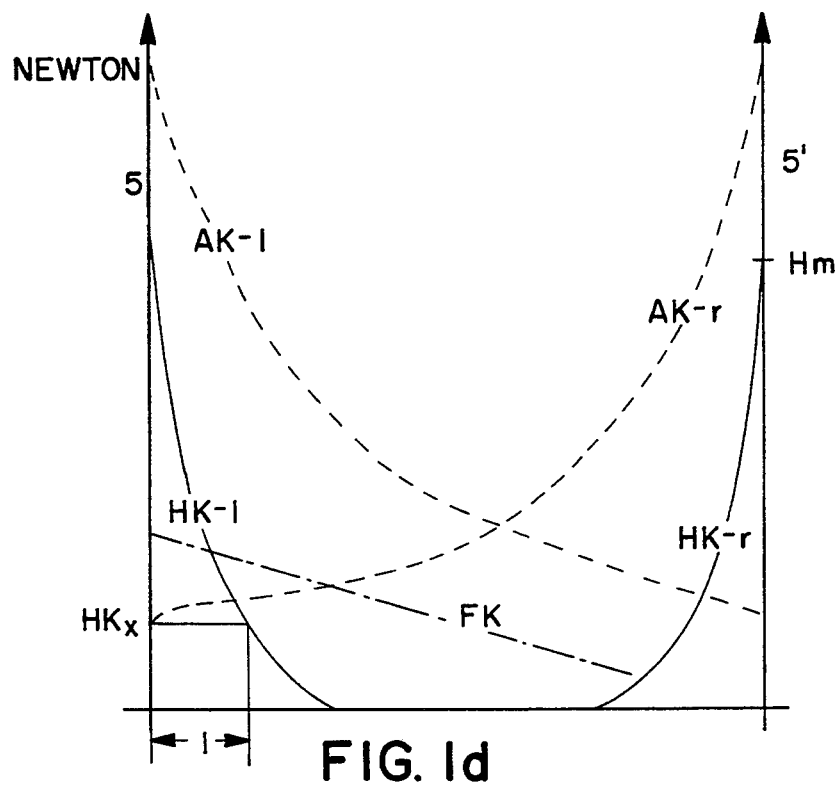
Figures 2A, 2B, 2C, 2D, 2E:
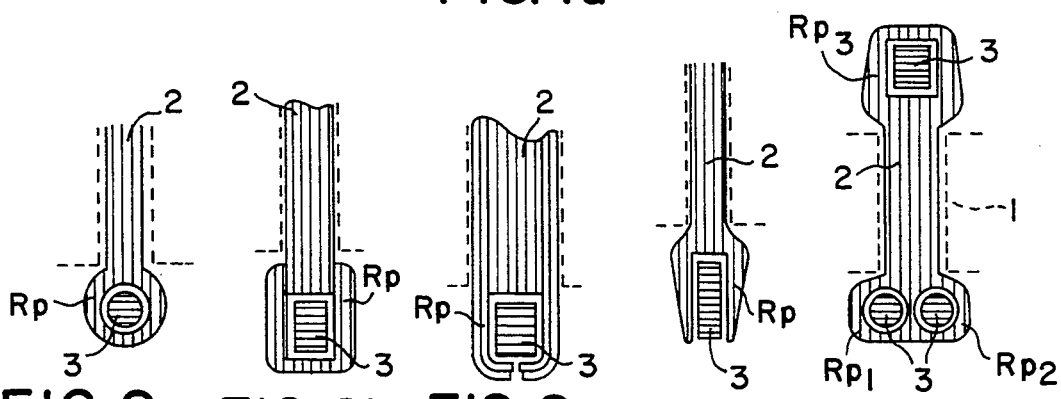
FIGS. 2a–2e are cross-sections of the annular pole-piece (which is a part of the core of the coil) plus the permanent magnets, the cross-sectional plane being perpendicular to the motion of the armature.

The armature 3, 4 moves to the right and generates a force dependent on the current and the excursion and shown by the characteristic curve AK-r of FIG. 1d (in dashed lines). This force is composed of four components $f_1$ through $f_4$ that are generated between the electromagnetic pole pieces (annular pole-piece Rp and stop pole-pieces 5, 5') and the permanent-magnet pole-pieces 4, 4'. These forces are shown in FIG. 2b and are the following:

$f_1$ = force of attraction between the right stop pole-piece 5' (N) and the pole-piece 4' (S), $f_2$ = force of repulsion between the pole-piece 4' (S) of the core and the annular pole-piece Rp (S), $f_3$ = force of attraction between the pole piece 4 (N) and the annular pole-piece Rp (S), $f_4$ = force of repulsion between the left stop pole-piece 5 (N) and the pole piece 4 (N).

The complexity of force formation (simplified herein) on one hand makes it difficult to treat the magnetic drive in mathematical form but on the other makes it possible by means of appropriate design of all pole pieces to match these forces to the particular application, in a manner made clear further below.

If the direction of the current is changed, the polarity of the annular pole-piece Rp or of the stop pole-pieces 5, 5' is changed and thereby also the nature of the forces denoted $f_1$ through $f_4$. Instead of forces of attraction there will then be forces of repulsion and vice-versa. The armature 3, 4 moves from the right stop position (FIG. 1c) to the left. The actuation force is shown by the characteristic curve AK-1. The actuation forces AK-1 and AK-r depend on current, armature position and speed of displacement.

If the current is interrupted, the armature 3, 4 remains in the last end position and adheres to the particular stop pole-piece 5 or 5' with a force caused by the field lines of the permanent magnets. This force is composed essentially of two partial forces (FIG. 1c):

$h_1$, which is generated between the stop pole-piece 5' and the pole piece 4' of the armature 3,4, and $h_2$, which is generated between the pole piece 4 and the annular pole-piece Rp.

Starting at the north pole of the permanent magnet 3, the magnetic circuit is closed through the pole piece 4, the annular pole-piece Rp, the magnetic core 2, the return yoke 6, the stop pole-piece 5, the pole piece 4' and back to the permanent magnet.

This force assumes a maximum value Hm when the air gap between the stop pole-piece 5'-pole-piece 4' and pole-piece 4—annular pole-piece Rp is closed, and drops rapidly as this air gap increases, which corresponds to a leftward displacement of the armature, approximately along a characteristic curve HK-r. This also applies to the left position of the armature, the holding force being described by the characteristic curve HK-1. In this instance the magnetic circuit is closed through the left half of the return yoke 6.

The described magnetic drive is widely applicable because allowing the generation of large forces in both directions, the power drain (in pulses) being exceedingly low. The low weight of the magnet armature allows using this drive as an oscillating magnet (for instance for pumps or razors . . .), the drive being by AC. When operated with DC, the magnetic drive itself is able to control current reversal at the arrival in the end positions, in the simplest manner through contacts. The armature being mounted sideways of the coil, it can be linked directly to the operational device (contacts, pumps, valve elements, clutch disks, actuators . . .) and to make compact operational units. In oscillatory drives, the laterally located operational unit will not be heated. The design of the magnetically and mechanically pertinent parts, making them integral or as multiple components, is decided by criteria taking into account the priority of the magnetic conditions in order to achieve specific characteristic-line behavior. However the mechanical details of the particular application must be considered, and as a rule the magnetic circuit must thereby be split, which is magnetically undesirable. The embodiment modes of the invention show how an optimal design is possible under these conflicting conditions. The magnetic core 2, the return yoke 6 and the stop pole-pieces 5 are made from a magnetically soft material with adequate permeability, ordinary steel also being suitable for such purposes. As regards oscillatory magnets or drives with short response times, laminated designs or the use of soft-magnetic, silicon steel of poorer electrical conductivity is recommended. FIG. 2 shows four cross-sections perpendicular to the direction of excursion of the armature 3 and through the annular pole-piece region of the core 2, FIG. 2e showing a core 2 with three annular pole-piece zones (Rp1, Rp2, Rp3), corresponding to a drive with three armatures. The Figure shows that the shape of the passages matches that of the permanent magnet 3, i.e. of the pole pieces 4, so that, considering the constraints of the air gaps, the magnetic field lines are transmitted with a minimum of losses between the armature 3, 4 and the annular pole-piece Rp. The height of the annular pole-piece Rp and the cross-section in the direction of armature excursion are selected to optimize the transmission of the field lines, as shown by FIGS. 3a–3d. The annular pole-piece surfaces facing the armature 3, 4 are flat and cylindrical (FIG. 3a) to match the shape of the armature, but also, as shown in FIG. 3b, they may be partly oblique if this matches the shape of the external surfaces of the pole pieces 4, 4'. The pole pieces 4, 4' are made of a soft magnetic material and are in contact with the permanent magnet 3, that is, they are extended magnet pole-pieces and by means of suitable fitting they also may carry out such mechanical operations as if they were pistons, valve elements etc. The pole pieces 4, 4' consist of economical, easily worked steel and complement the armature 3, 4, and allow, on one hand, to keep the permanent magnet 3 simple and compact, and on the other hand to keep the spacing between the annular pole-piece Rp and the stop bolts 5, 5' large to prevent direct shunting of field lines between the electromagnetic pole-pieces (Rp, 5, 5'). The shape of pole pieces 4, 4', which is widened in FIG. 3a and flaring in FIG. 3b, in the region of the pole pieces, is such that on one hand they will prevent as much as possible a direct shunting of the field lines between the electromagnetic pole-pieces (Rp, 5, 5') and on the other hand they will make the effective surface of the pole-pieces larger in order to minimize air-gap losses. In the light of operating economy, the drive cannot always be magnetically optimized, and therefore shapes of pole pieces which magnetically are disadvantageous may be selected, for instance as shown in FIG. 3c.

In order to keep the armature small on the left side, a cylindrical pole piece 4 with a funnel-shaped recess was selected. The pole piece is made lighter thereby and the surface facing the stop pole-piece 5 is larger.

Figure 3A:
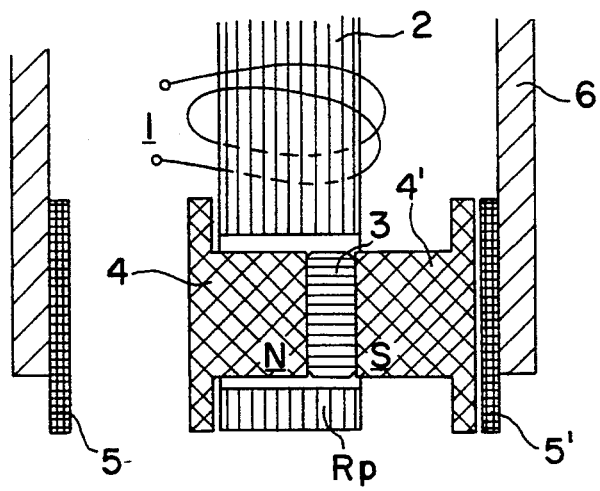
FIGS. 3a–3d are various sections in the plane of the armature-excursion axis, that is they are cross-sections of the pole-piece and armature zone.
Figure 3B:
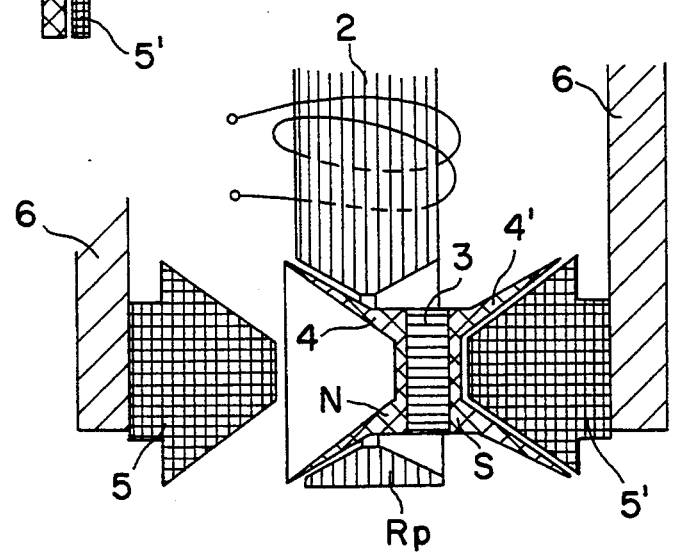
Figure 3C:
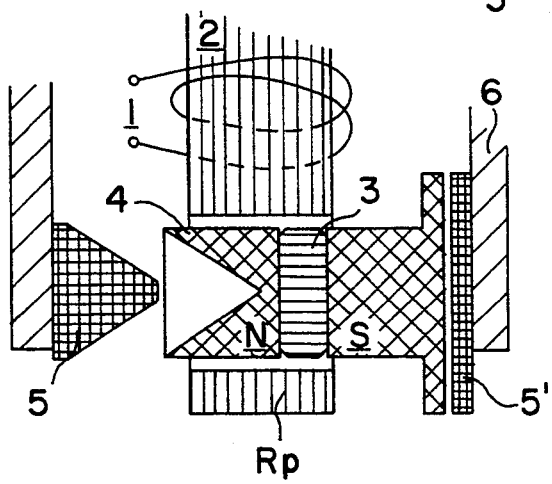
Figure 3D:
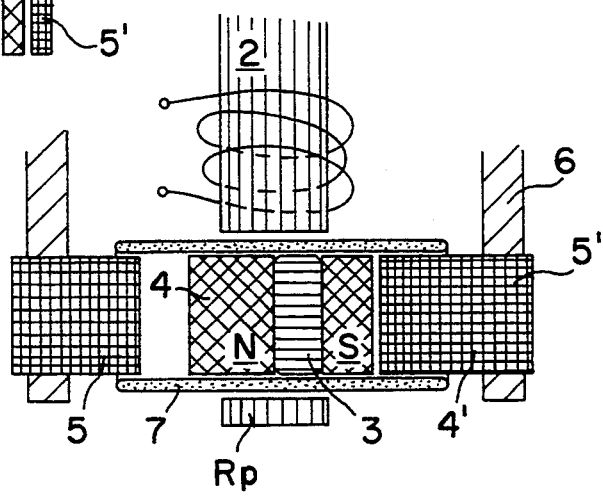

The pole piece 4' comprises a large pole surface facing the stop pole-piece 5' and perpendicular to the direction of motion and allowing optimal generation of force.

Where simplicity more than efficiency is at a premium, the shapes of the pole-pieces 4, 4' can be selected to be as in FIG. 3d, i.e. cylindrical, and which as needed make possible different characteristic curves on account of different lengths for actuation from left and right. Knowledge of magnetics applies to shaping the pole-piece surfaces facing the air gaps, for instance:

large, plane surfaces as in FIG. 3a as a rule and at constant excursion result in higher initial forces, that is, in shallower characteristic curves AK (FIG. 1d) and in higher efficiencies, enlarging the pole-piece surface by making them conical as in FIG. 3b allows larger excursions at constant initial forces but decreases the force at the end of excursion, in other words, it brings about very shallow characteristic curves.

Depending on the application for which the drive is being used, different pole pieces 4, 4' and dimensions may be selected, which also may be different relative to their north and south pole sides.

FIG. 3b shows a design of the pole-piece surfaces optimized for weight and efficiency. The pole pieces 4, 4' evince large areas on their insides and outsides, the wall thickness being very slight, i.e. very lightweight, and on account of their obliqueness they allow large excursions with a slightly rising characteristic curve.

A design such as shown by FIG. 3a is recommended to actuate pumps and compressors, locking devices, swing doors, contactors, slide valves and also to serve as a proportional magnets. The stop pole-pieces 5, 5' assume a shape matching that of the pole pieces 4, 4', as shown by FIG. 3, and they are mounted coaxially with the armature 3, 4. The stop pole-pieces 5, 5' and the return yoke 6 evince similar magnetic properties and therefore it is feasible in some instances that the former be an attached extension of the return yoke 6. Proper operation of the magnetic drive requires as accurately as possible positioning the electromagnetic pole pieces such as the annular pole-piece Rp and the stop pole-pieces 5, 5'. This position can be implemented by a non-magnetic (for instance plastic or pressure-cast metal alloy) retention-means 10 affixed to the core 2 directly behind the annular polepiece Rp and which forms the shortest mechanical bridge between the annular pole-piece Rp and the stop bolts 5,5' (see illustrative embodiments starting with FIG. 4). The top pole-pieces 5 are mounted to this retention-means 10 which also acts as a slide means for the armature 3, 4 or serves as support for the remaining parts of an operational device. Therefore the retention-means 10 may be customized regardless of the magnetic conditions, and this will be shown in application examples. This retention-means allows dismantling the return yoke 6 and the coil 1 without thereby taking apart the zone of the pole-pieces, and this is often desirable. The bobbin of the coil I also may be designed to be an extension of the retention-means 10.

Figure 4:
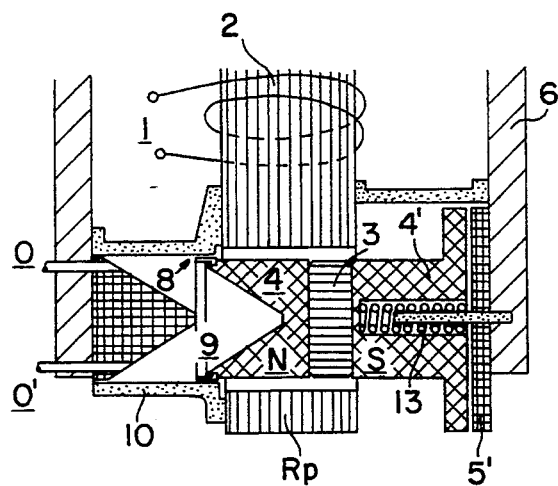
FIGS. 4–10 are examples of applications of the invention that elucidate how operational devices can be driven in the armature-polepiece space with minimal expenditure and possibly can be integrated without accessories.
Figure 5:
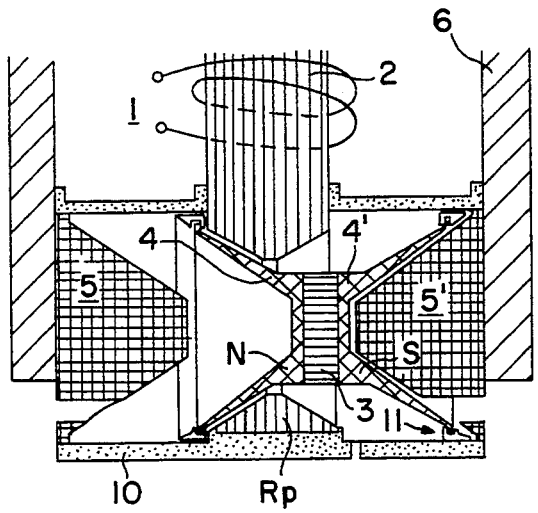

Looking at FIG. 1b and taking into account the tendency of any magnet to be attracted by a magnetically soft material and to adhere to it, it is clear there is need for mechanical guidance of the armature 3, 4 which otherwise would tip and rub against the annular pole-piece (shown in dashed lines), whereby normal operation would be hampered. Armature guidance by a thin push or pull rod which in this instance would pass through the permanent magnet 3, the pole pieces 4 and the stop pole-pieces 5, is conventional. Applicable materials are non-magnetic high-grade steel or other expensive alloys. The magnet 3 must comprise a borehole and thereby is substantially more expensive and offers less cross-sectional area. Such drawbacks can be avoided if the armature 3, 4 together with the pole pieces 4 are affixed by a guide sleeve 7 to the external periphery, as a result of which the permanent magnet 3 need not be drilled through. This sleeve 7 may extend beyond the length of the armature and slides in the manner of a slide bearing over the stop pole-pieces 5 (FIG. 3d) at the periphery of which only few field lines issue from those pole-pieces. This guidance averts sliding friction inside the annular pole-piece, where magnetic particles might accumulate on account of the magnetic field transition. This sleeve is made of a nonmagnetic material (metal or plastic) and is long compared to its diameter, and further it prevents the armature from tipping. The sleeve 7 may bear components of an operational device or it may act as a seal like a movable cylinder relative to the stop pole-pieces 5, the stop pole-piece representing a stationary piston. Depending on the application, the sleeve 7 may be of one or more pieces and be matched to the device to be driven. FIGS. 4 and 5 show embodiment modes of the region of the armature-annular pole-piece-stop pole-pieces applicable to different purposes. FIG. 4 shows a magnetic drive corresponding to FIG. 3c, to which are affixed mechanical elements of a reciprocating pump. A retention-means 10 is mounted around the stop pole-piece 5 and serves as a compression cylinder for the polepiece 4. For that purpose, the pole-piece 4 comprises a sealing lip 8. The stop pole-piece 5 serves as a cylinder bottom for the excursion space 9 and may be fitted with flow boreholes o,o' which may include (omitted) valves. The pole piece 4' comprises a borehole receiving a non-magnetic compression spring 13 to partly store the excursion work generated by the armature when moving to the right and to return this work of compression as useful work. This design with unilateral spring support is simple and suitable for moderate pressures .or excursions.

Figure 6:
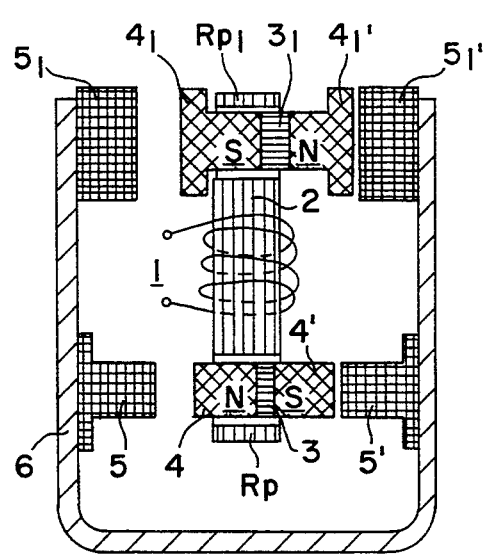

FIG. 5 shows an illustrative application of the drive of FIG. 3b as a dual-acting pump for moderate pressure and substantial flows. The especially lightweight armature 3, 4 comprises sealing lips 11 for instance made of a PTFE mixture, at the edge of the funnel-shaped pole-pieces 4, 4'. These lips at the same time serve as guides in the retention-means/compression-cylinder 10 extending over the stop pole-pieces 5, 5' sealing the cylinder 10, where called for flow apertures o possibly together with valves being present in the stop pole-pieces 5, 5' or in the cylinder walls or the pole pieces 4, 4'. FIG. 6 shows a cross-section of a magnetic drive with two armatures mounted on the two sides of the coil, the core 2 comprising two annular pole-piece zones similar to the case of FIG. 2e. For the sake of simplicity only a middle borehole in the lower part of the annular pole-piece Rp is shown. The return yoke 6 in this case extends over the lower pole-pieces 5, 5' and the upper pole-pieces $5_1$, $5_1'$ and connects them by means of a magnetically soft yoke segment of a reluctance as low as possible. For the sake of clarity in the drawing, the yoke segment magnetically connecting the lateral stop pole-pieces 5,5' and $5_1$, $5_1'$ is shown at the bottom, but in practice it is more advantageous to mount it to the side of the coil. The upper armature $3_1$, $4_1$ is magnetized in the opposite direction of the lower one, that is its south pole is left. A control pulse of sufficient magnitude with respect to the two air gaps between the stop polepieces 5, $5_1$ and the pole pieces 4, $4_1$ and inducing the polarity 8 at the upper annular pole-piece Rp and the polarity N at the lower one, ensures that the two armatures move to the left until impacting the stop pole-pieces 5, $5_1$. The control rightward is implemented by a pulse of opposite polarity. In case the upper armature is fitted with a more powerful magnet $3_1$, the motion of the lower armature 3, 4 into the opposite position may also be implemented by the mechanical displacement of the upper armature $3_1$, $4_1$ in the same direction. The polarity of the lower stop pole-pieces 5, 5' suitable to initiate the excursion is then predetermined by the upper armature as described on pages 3 and 4.

A magnetic circuit of this kind has many applications, for instance:

as a magnetic drive with two operational armatures,
as a magnetic drive with one operational armature out of sight, for instance enclosed in a valve chamber, the second armature actuating a position display,
as a magnetic drive with several spatially separate armatures, with manual emergency actuation and position display, the bigger and manually accessible armature with position display being able to supply the magnetic field—in lieu of the coil supplying said field—with which to displace the remaining operational armatures.

Figure 7:
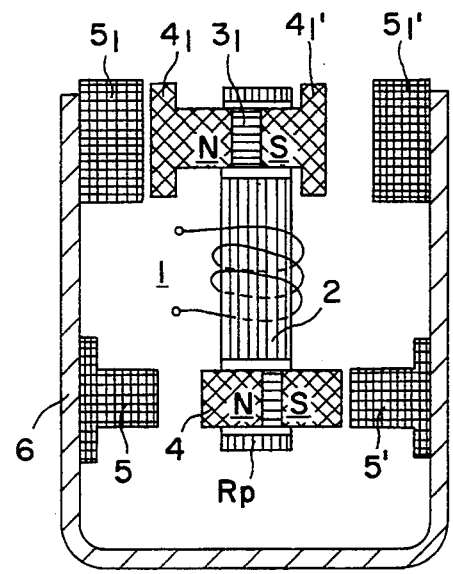

FIG. 7 shows a magnetic circuit similar to that of FIG. 6 with two armatures 3,4 and $3_1$, $4_1$ which in this case are magnetized in the same direction (N poles leftward), said circuit being functionally the same as the one described above, except that the armatures moves in opposite direction when subjected to electrical control.

As indicated by FIG. 2e, there is the possibility to mount several armatures 3, 4 on the same side of the coil, said armatures moving parallel to each other and being magnetized in the same direction or in opposition. If the polarity is the same, two adjacent armatures shall behave magnetically as if one, however they may move in separate spaces or media such as liquids.

Figure 8:
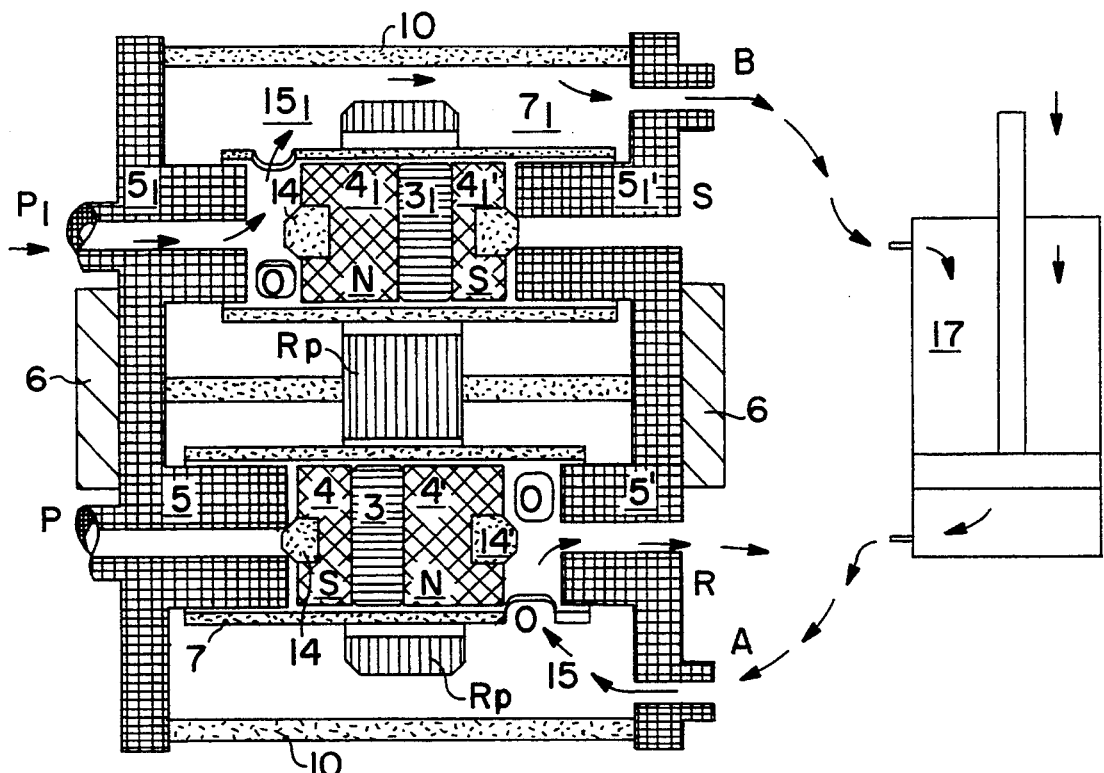

FIG. 8 shows a cross-section, corresponding to the section plane A, A' of FIG. 2e, of the armature pole zones of a magnetic drive designed for magnetic valves with two adjacent armatures polarized in opposite directions. The armatures with the permanent magnets 3 (bottom) and $3_1$ (top) and the pole pieces 4, 4' and $4_1$, $4_1'$ comprise valve cones 14 inserted into the pole pieces. Opposite the pole pieces 4, 4' and $4_1$, $4_1'$ the stop pole-pieces 5, 5' comprise extensions with pressure lines P, $P_1$ and exhaust lines R, S which can be alternatingly blocked by the valve cones 14 depending on the positions of the armatures 3, 4 and $3_1$, $4_1$. The stop pole-pieces 5, 5' also may be made in several pieces and are well connected magnetically to the return yoke 6. The armatures 3, 4 and $3_1$, $4_1$ are held in guide sleeves 7, $7_1$ sliding over the extensions of the stop pole-pieces 5 and evincing apertures o allow fluid flow (shown by arrows) into the valve chambers 15, $15_1$. The armatures 3, 4 and $3_1$, $4_1$ together with the guide sleeves 7, $1_1$ and the valve cones 14 in this case serve as valve components and move within the two passages of the annular pole-piece Rp. The valve chambers 15, $15_1$ present between the stop pole-pieces 5 and around the valve components comprise non-magnetic, tight pressure chamber walls 10, for instance made of metal, epoxy resin or plastic, which also serve as retention-meanss. They partition the spaces surrounding the valve components and are connected by conduits for instance leading to a dual-acting pneumatic cylinder 17.

When the flow lines p, $P_1$ of the stop pole-piece 5 are connected to a source of compressed air (the venting lines R, S issue into the atmosphere), the compressed air passes through the apertures o of the upper valve member, through the valve chamber $15_1$, the operational hookup B and the conduits as far as above the piston of the pneumatic cylinder 17 which it forces down. The space below the piston communicates through the lower flow line with the atmosphere. If the valve is then switched, both armature valve components of the magnetic valve will almost simultaneously change their position; accordingly the flow lines P and S are opened and the previously opened flow paths $P_1$ and R are closed. The compressed air passes through the operational hookup A below the piston of the pneumatic cylinder 17 which moves upward because the pressure chamber above the piston can exhaust through the flow path S into the atmosphere. This described illustrative application thus shows the simple design of an assembly controlled by a single coil consisting of two three-two-way valves (three ways, two positions) performing the function of a five/two valve, for instance to drive dual-acting pneumatic cylinders.

If needed, the magnetic drive furthermore permits other combinations of single or several three/two-way valves with or without position display for the valve member or emergency manual actuation. This becomes clear by considering FIG. 8 in comparison with FIG. 2e. In principle a valve chamber can be designed around every annular pole-piece borehole Rp receiving an armature. The armature 3, 4 is fitted with a guide sleeve 7 and a valve cone 14 and thus becomes a sealing member. This member can block the flow paths present in the stop pole-pieces 5.

Where such designs are advantageous, it is thus possible to mount one, two or more three/two-way valves on one or both sides of the coil—see FIG. 2e.

Figure 9:
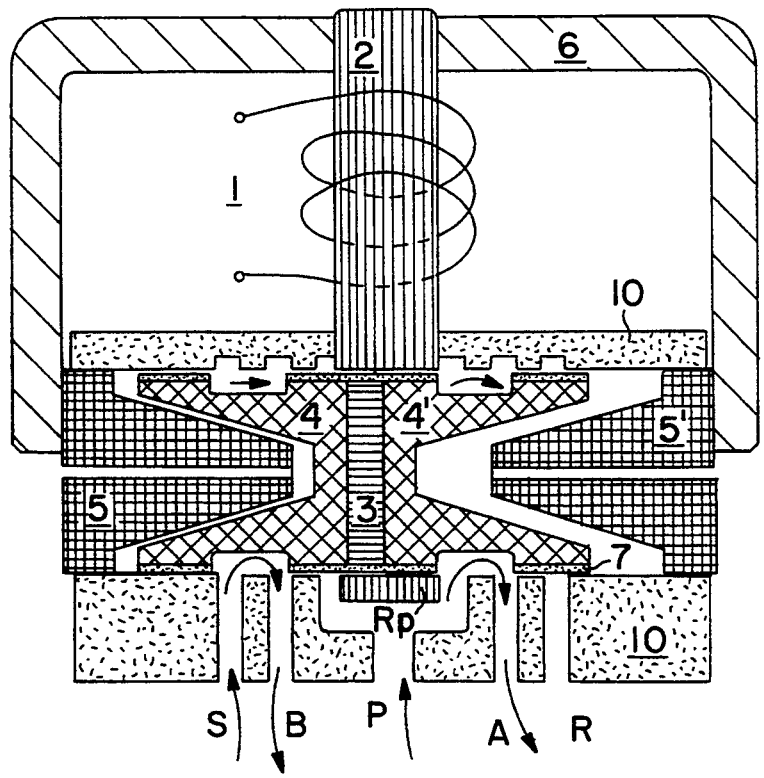

FIG. 9 shows an illustrative application of the invention to a slide valve characterized by an extremely low slider weight. The armature 3, 4 serves as the slider, a nonmagnetic sleeve 7 extending over the pole-pieces 4, 4' holds together the parts 3 and 4 and is designed to function as a component of the valve slider. As is the case for conventional slide valves, the slider 3, 4, 7 may connect the pressure lines P with the operational lines A, B or the latter with the exhaust lines R, S. These lines are worked in this instance into a retention-means/-valve-block 10. This block illustratively consists of non-magnetic steel and receives the annular pole-piece zone Rp of the magnet core 2 which for instance was inserted by brazing. The valve block 10 together with the annular pole-piece can be worked with the required accuracy inside and out. The horizontal borehole allowing the slider 3, 4, 7 to slide freely with the least play is enclosed sideways by the stop pole-pieces 5, 5' which are conical to correspond to the front side of the pole-pieces 4, 4' in order to endow the magnetic drive with a characteristic curve of as constant a force as possible. If an (oil) pressurized source is connected to the line P, and an actuator to the operational lines A and B, then, as described in relation to FIG. 8, the piston motion can be controlled by means of this valve. The rightward motion of the slider 3, 4, 7 entails the breaking of the connections between lines B and A or B and S. In the process, communication is set up for flow P-B and A-R. If larger forces were required at the slider, for instance in the case of high-pressure hydraulics, then a more substantial magnetic drive can displace valve sliders of lesser diameters and located outside the magnet core. Such sliders for instance may be operational inside correspondingly designed stop pole-pieces 5.

Figure 10:
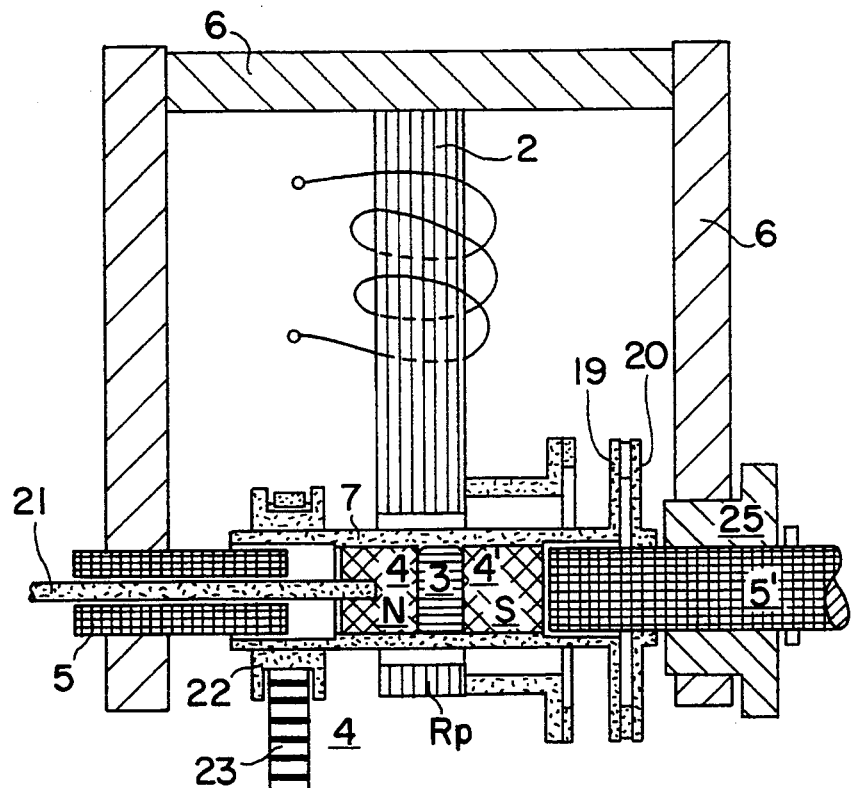

FIG. 10 shows an illustrative application of the invention as a clutch-brake unit wherein the coaxial parts such as the stop pole-pieces 5 and the armature 3, 4 belong to a rotatable drive train. The armature 3, 4 is inserted in a sleeve 7 rotatable relative to the stop pole-pieces 5, said sleeve extending over said pole-pieces by cylindrical projections servings as supports. The sleeve 7 bears a friction disk 19 of minimal moment of inertia. As shown, this disk can be driven by a clutch plate 20 rigidly joined to the stop pole-piece 5' acting as a rotating drive shaft and hence rotating with it. The motion of the drive shaft 5' therefore is transmitted in the shown position of the armature 3, 4 by the disk and plate 20 and 19 to the sleeve 7, i.e. the armature 3, 4. Farther away axially, the rotation can be assumed by a non-magnetic drive shaft 21 keyed in irrotational manner in the pole piece 4. Alternatively the rotation also can be transmitted for instance by a toothed pulley 22 with toothed belt 23 affixed to the sleeve 7 instead of the drive shaft 21. When wishing to brake the drive shaft, the armature 3, 4 together with the sleeve 7, drive elements 21, 22 and friction disk 19 are moved leftward until said disk comes to rest while in contact with the brake pulley 23. The magnetic field lines from the return yoke 6 are fed for instance through the bearing 25 into the stop pole-piece/rotating-shaft 5', said bearing in such a case consisting of a porous and magnetically soft sintered steel.

Because of the increasing magnetic attraction and high holding forces near the two end positions, the drive is especially well suited for relays and contactors in which substantial contact compressions are desired. The characteristic curve of the magnetic drive (FIG. 1d) is very similar to the actuation forces of a switch contact. A compact switch is created by mounting contacts or sets of contacts near the armature 3, 4 of a drive such as the one shown in FIGS. 3a or 3d.

The contacts or contact blades can be driven directly by the armature sleeve 7 appropriately made of plastic and fitted with lateral drive accessories such as the drive comb of a comb relay.

Figure 11:
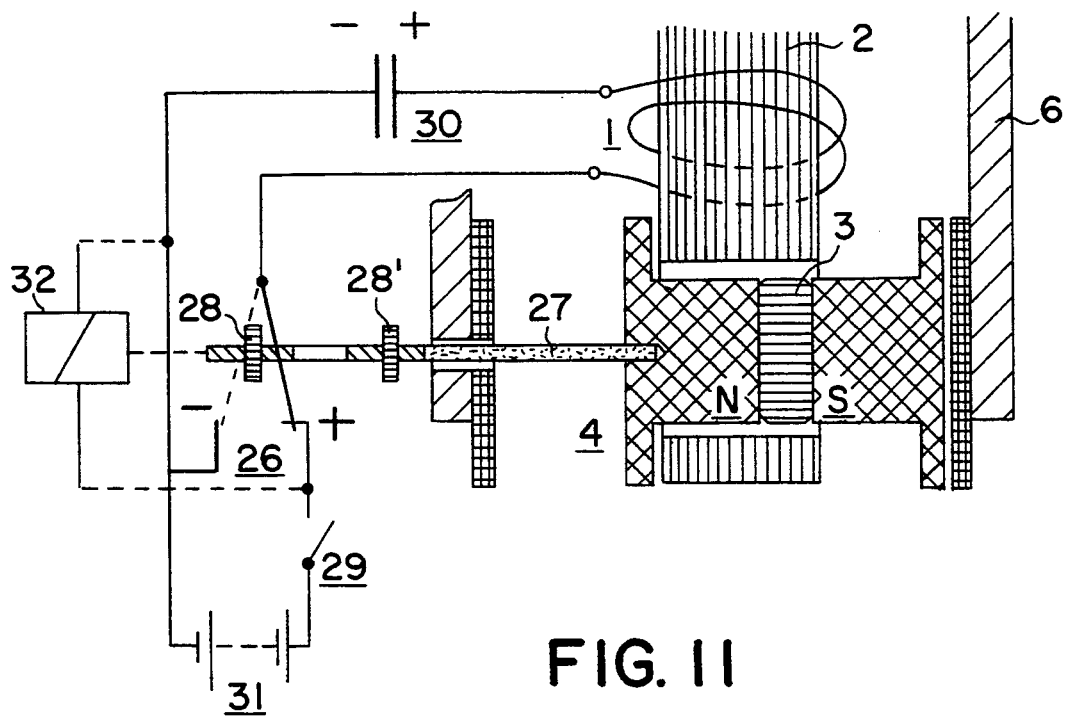
FIG. 11 is an illustrative circuit for operating the magnetic drive as a reciprocating magnet fed from a DC source.

The magnetic drive also may be used as an oscillating magnet in which the armature 3, 4 dwells only briefly at the stop positions, that is, it makes contact or arrives in the vicinity of the stop pole-pieces 5. An oscillatory driving force can be achieved by applying AC or square, trapezoidal or sawtooth pulses of changing polarities to the coil. Appropriately such pulses are triggered as a function of the position of the armature 3, 4. In the simplest case this is implemented by end-bearing contacts such as are shown in FIG. 11 in cooperation with a capacitive switching circuit. The displaceable contact of the bistable reversing switch 26 is connected to one end of the coil 1 and can be moved by the actuation bar 27 from the plus contact on the right side to the minus contact on the left side. Two adjusting nuts 28 are present on the threaded actuation bar 27 and allow precisely setting the switching points of the switch 26. If the armature 3, 4 moves leftward, then it displaces the actuation bar 27 rigidly affixed to the pole piece 4 also leftward. The right adjusting nut 28' moves the blade of the switch 26 leftward (from + to −) only when the left stop position of the armature 3, 4 at the stop pole-piece 5 has been almost reached. The reversal to the initial position (from − to +) takes place shortly before the armature 3, 4 arrives at the stop pole piece 5'—again using the adjusting nut 28.

Operation

The armature 3, 4 together with the switch 26 is in the position shown on the right. When the power switch 29 is closed, current is present in the coil 1 and goes from the switch contact 26 to the capacitor 30. This current causes the leftward motion of the armature 3, 4 and at the same times charges the capacitor 30. The current pulse ends when the armature 26 jumps onto the left position (−). At that time the capacitor 30 is charged or nearly so, and as a result the right contact (at +) opens almost in the absence of current. The closure of the left (−) contact now entails that the current goes from the plus terminal of the capacitor 30 to the reversing-switch contact, that is, in the opposite direction.

The capacitor discharges and the armature 3, 4 returns to its initial position. Shortly before arriving at the right stop pole-piece 5', the switch 26 reverses to the plus contact and the just described operational cycle is repeated; accordingly the armature is operated in oscillatory manner. Power drain in this sort of operation is minute because the energy is taken from the battery 31 only in one direction of motion. Contact life is high because they open almost in the absence of current (with low spark formation). In lieu of an assembly of capacitor 30 plus coil 1, this magnetic drive also may use, as mentioned, an energy-storing inductive-capacitive coil.

If the reversing switch 26 is externally controlled, then this charge-discharge circuit also permits individual actuation procedures.

Generation of the actuation pulses using other known means (inverting switches center-tap coils etc.) is always feasible, but as a rule will be more complex.

In lieu of the mechanical reversing switch 26 (FIG. 11), contact-less sensors such as proximity switches, Hall sensors, light barriers etc. may be used, which shall control electronic pulse generation. The arrival of the armature 3, 4 at the end position at the stop pole-pieces 5, 5' also can be ascertained using one or more additional coils and be processed for control-pulse generation. When the stop position is reached, a strong change in magnetic field takes place in the magnetic circuit (core 2, return yoke 6 and stop pole-pieces 5) and results in a winding surrounding these parts in a characteristically steep voltage rise which may be used to trigger the reversing pulses.

The above discussed illustrative embodiments merely serve as concrete design hints. Illustratively the expert can decide to replace these piston embodiments with membrane or piston membrane pumps. He may provide non-magnetic spacers (for instance elastic, noise-abating plates) between the pole pieces 4 and the stop pole-pieces 5.

As shown by FIG. 1d, wherein an air-gap plate of thickness 1 is assumed being present at the stop pole-piece 5, such spacers by restricting the excursion lower the sometime unnecessarily steep rise of the attraction forces AK-1 and also the retaining force HK-1. If the force AK-1 is counteracted for instance by a spring force (FK characteristic curve) that now shall overcome the reduced spring holding force $HK_x$, then, when the coil of the armature 3, 4 is without current, said armature shall be repelled rightward. In this manner the behavior of the magnetic drive is mechanically modified to be monostable.

Monostable operation is frequently desirable and can be achieved while retaining all the drive's advantages by controlling a circuit with capacitive energy storage as shown by FIG. 11. In this case the reversing switch 26 shall be mono-stable and shall no longer be driven by the armature but instead externally by the application of a voltage for instance to the relay coil 32 (shown in dashed lines with terminals). Before the voltage is applied through the switch 29, the reversing switch 26 is in the left (−) position. Upon application of the voltage, the relay coil is energized and the switch 26 moves to the right side (+). The coil 1 is energized and the armature 3, 4 moves leftward, the capacitor 30 charging and remaining under power. After the switch 29 is opened, the reversing switch 26 reverts to its initial position (leftward into −) and the capacitor 30 discharges into the coil 1, as a result of which the armature returns to its initial position (to the right).

The application/removal of the voltage by means of the switch 29 achieves monostable-operation control, the coil 1 being powered for a short time with minimal power losses. As known in the technology of relays, similar circuits also may be implemented electronically. Accordingly the invention makes possible a wide range of electromechanical products at little mechanical investment, while offering substantial advantages such as energy conservation, low armature weight, two-directional control, change in drive behavior by circuit design, compactness etc.

Furthermore the invention concerns special designs of magnetic drives that expand on the above described embodiment modes, especially as regards monostable operation. Herein the magnetic drive shall be matched to practical applications with retention of the features especially concerning the permanent-magnet armature which always shall contain a flat high-performance magnet and which slides within an annular pole-piece around it. There is the feasibility to render the inherently bi-stable magnetic drive monostable by resort to suitable circuitry.

Further designs of the pole-piece zones are discussed below which change the characteristic curves of the magnetic drives in such a way as to permit mechanically monostable operation. Also discussed is the way in which the magnetic drive can be matched by dividing the coil to different installation conditions, the power efficiency being raised.

The same reference numerals as before will be used for the same components.

Figure 12:
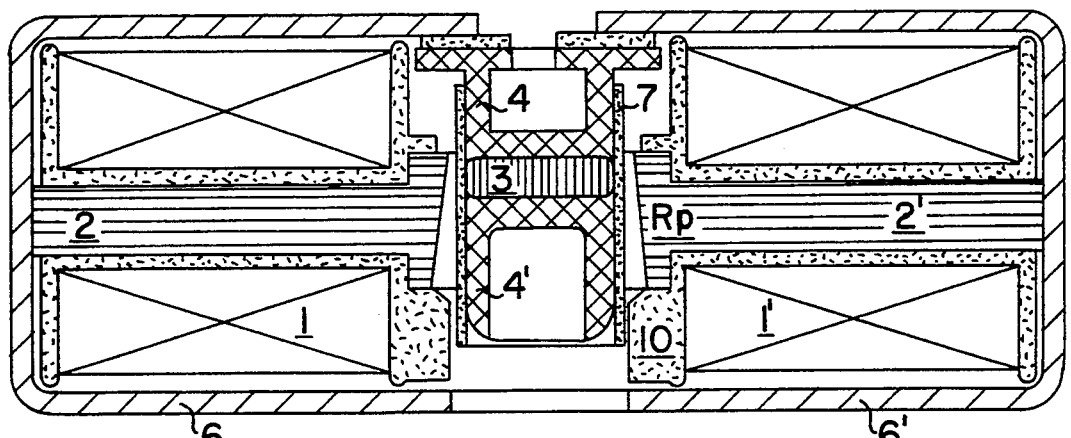
FIG. 12 is an illustrative embodiment of the magnetic drive with a coil divided in two and asymmetric pole-piece regions.

The magnetic drive of FIG. 12 comprises two coils 1, 1' and two corresponding magnetic cores 2, 2' and two external yokes 6, 6' each half the magnetic cross-section of that required for one coil. These coils are wound in such a way that when energized, they always impart the same polarity, for instance south (S), to the annular pole-piece Rp. As a result they act magnetically as if they were a single coil, though the power efficiency is higher (ampere-turns/watt) at constant bulk.

For the same coil cross-section or quality in the space receiving a number of n coils in which a current I is present, the division into two coil segments allows lower necessary voltage (power). This is the case because the two coils, each of a length L and with n/2 turns on each, evince less wire (lower resistance) than one coil of the same length L and with n turns, which evince a larger mean resistance. The magnetic core 2 divided cross-sectionally into two halves also contributes to shorten the mean winding length.

The rare-earth high-performance magnet 3 is located between the pole pieces 4, 4' which to the extent allowed by the magnetic minimum cross-sections are hollowed to save armature weight. A non-magnetic sleeve 7 centers the parts 3, 4 of the armature and may serve as mechanical guidance. The pole piece 4 widens in T-manner above the annular pole-piece Rp and as a result the characteristic curve of attraction Ak (FIG. 13) rises slowly. For the same purpose or to change the characteristic curve to achieve monostable operation, resort is made to the design of the pole piece 4' which is rounded at the lower side and can dip into a borehole in the underside of the external yoke 6. Accordingly there is not in this zone a frontal impact between the pole pieces 4' and 6 which would, as is known, result in a large, steeply rising force depending on the excursion.

Figure 13:
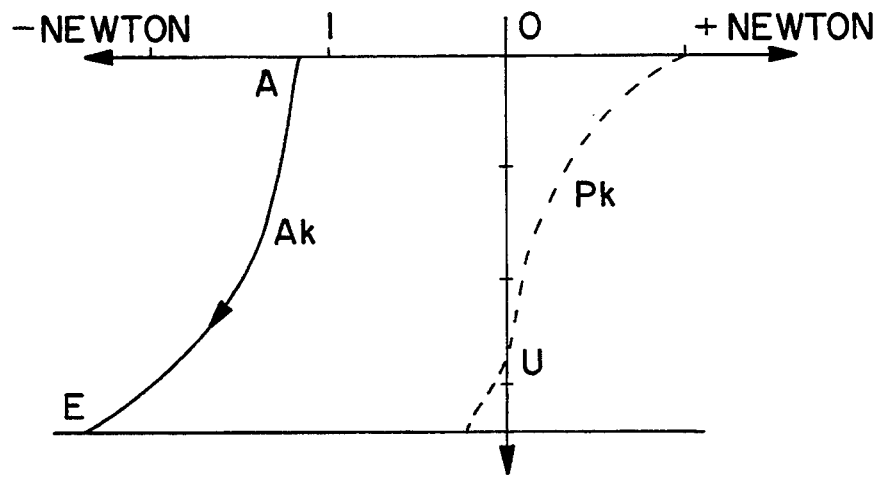
FIG. 13 shows the characteristic curves of this drive.

Depending on how the characteristic attraction curve must be changed, this pole zone 4', 6, 6' also may be designed in a different way, for instance with a cylindrical or conical extension of the passage in the lower part of the external yoke 6 as illustratively shown in FIGS. 15, 15 and 16. FIG. 13 shows the basic electromagnetic attraction force Ak for a predetermined direction of flux or permanent-magnet holding force Pk of a magnetic drive of FIG. 12. The vertical axis corresponds in direction to the armature excursion (downward from the shown position). The downward forces (−) are plotted on the left and the upward forces (+) on the right, the latter causing the return of the armature. In mechanically monostable operation of the magnetic drive, the armature shall return solely on account of permanent-magnet forces. When the coil is energized, the electromagnetic attraction force reaches the value A which is selected higher than the force of the device being powered, so that the armature 3, 4, 4' moves downward, the force increasing according to the characteristic curve Ak until the lower armature position E is reached. If the armature is free of external forces, then following power OFF, and according to the characteristic curve Pk, it remains adhering to this position because in that excursion zone, the permanent-magnet force Pk (dot line) is negative. Considered by itself, the magnetic drive is bistable in this case. If by means of an external and upward force (+)—accessory spring, reaction of the driven device—the armature is moved upward against the negative portion of the forces Pk and beyond the reversal point U, then this upward motion shall henceforth be reinforced by the positive portion of the force Pk. Provided there be a slight restoration assistance—namely overcoming the negative portion of the forces Pk—the magnetic drive shall operate in monostable manner.

It is possible, by construction, to move the reversal point U so far down that the magnetic drive per se is monostable, that is, the permanent-magnet forces only have a positive sign on the predetermined excursion. Monostable operation may be achieved by enlarging or suitably shaping the air gap between the pole piece 4 and the annular pole-piece Rp or by shaping the lower pole parts 4', 6 or by means of a conical shape of the annular pole-piece Rp open at the bottom, in particular at its lower side, or by indentations in the annular pole-piece such as illustratively shown by FIG. 14. Taking into account the magnetically pertinent conditions, all magnetically soft parts 2, Rp, 4, 6 can be divided and assembled in arbitrary manner.

Appropriately as regards manufacture, the magnet cores 2 together with the annular pole-piece Rp shall be enclosed for instance in an injection molding of an insulator such as a thermoplastic, epoxy resin etc. and in this manner the spools or the mechanical guidance for the armature shall also be made in one step.

The injection-molded plastic body 10 accordingly serves simultaneously as a bobbin for the two coil segments 1, 1' and also may include electrical terminals, it may act as a mechanical guide for the armature illustratively sliding by its upper or lower side relative to the plastic body 10, and as a spacer (air gap) between the upper Side of the pole piece 4 and the annular pole-piece Rp.

Figure 14:
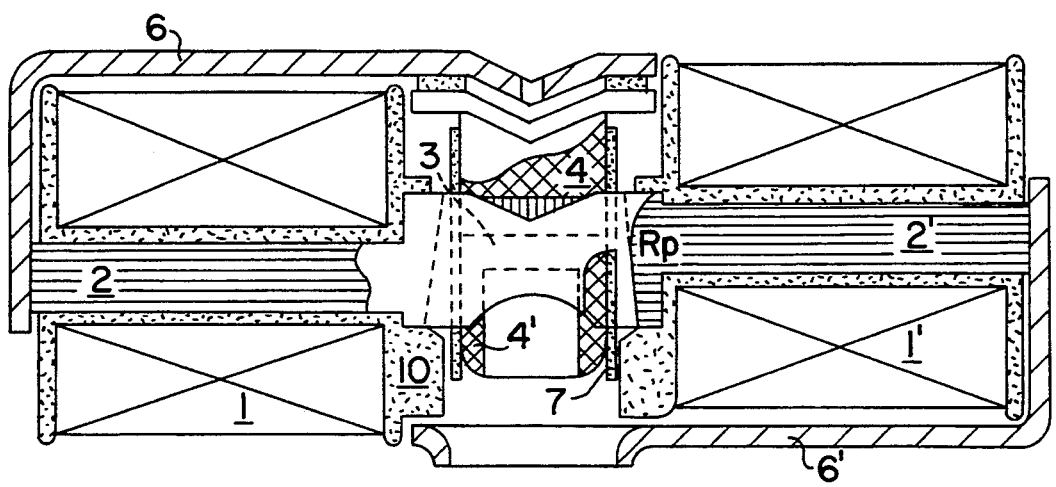
FIG. 14 is a variation of the magnetic drive of FIG. 12 with an external yoke mounted only on one side of the coil.

FIG. 14 schematically shows a magnetic drive which in comparison with that shown in FIG. 12 comprises on the side of each coil an external yoke 6 with only one leg. This yoke 6 extends over the pole-piece region of the armature 3, 4 and therefore the yoke 6 of the left coil serves as the upper external pole-piece and the yoke of the right 6' serves as the lower external pole piece. Thereby the magnetic circuits of the left and right coils are entirely independent from one another. This offers the advantage that if desired an asymmetric power distribution regarding the two coil segments can be implemented to improve the dynamic properties of the drive.

If for instance the two coils are connected in series and a capacitor is in parallel with the right-hand coil, then voltage applied to the coils will result in the current in the left coil half being higher shortly after the power is ON, opposing the adhesion tendency of the upper pole piece 4 to the yoke part 6 and thereby more easily initiating displacement.

A similar but as a rule less marked brief shift of the magnetic field in the air gap above or below the annular pole-piece Rp also can be achieved with shorted turns mounted at located positions, for instance on the return yoke 6, also as regards other magnetic circuits, as shown in FIG. 12.

Magnetic circuits such as shown in FIG. 14 also may evince different coil parameters in the partial coils in order to control the .characteristic curves, as a result of which the ampere-turn numbers always are different for the two segments of the magnetic drive.

Also, FIG. 14 shows another design of the pole-piece zones near the armature. The annular pole-piece Rp (not shown in section in this case) does not assume a constant height but evinces symmetrical elevational indentations, which are V-shaped at the top and arcs-of-circle at the bottom. The object is to prevent the peripheral edge of the permanent magnet 3 from riding (during the armature excursion) simultaneously over the entire periphery of the annular pole-piece Rp. One consequence would be that an irregularity (snap-in point) would arise in the drive's characteristic curve. The circumference of the edge of the annular pole-piece no longer being a plane on account of the described design, such snap-in points may be avoided or smoothed. This design of the annular pole-piece Rp also is matched by the shape of the pole piece 4 of which the broad side is V-shaped, and the extension of the external yoke 6 above also is V-shaped. These steps also are applicable to the other embodiment modes of the main patent application.

Because there are .several operational air gaps, the expert may design them individually and thereby he may control the attraction-force characteristic curve both in the region of initial excursion as well as in the middle and end regions, and this within wider limits than in previous magnetic drives.

Because of the center armature position, the magnetic drives of FIGS. 12 and 14 are especially well suited as contactors and allow designing narrower contactors for higher mounting density on an assembly rail. FIGS. 15 and 16 show an advantageous spatial design of a narrow contactor with the magnetic drive of FIG. 12 which in this case comprises a hollow-cone pole-piece 4' in the lower pole-piece region. The armature 3,4 directly drives the displaceable contacts 21 along the vertical axis of symmetry, said contacts being part of a set of contacts KB. Illustratively three-phase conductors R, S, T are connected by clamping screws 23 or clamps 24 to the stationary contacts 22, 22'. FIG. 16 shows a cross-section of this contactor. In the case of a mini-contactor with the prevalent switch-capacity of about 6 kw, the drive width B is about 25 mm. The vertical arrangement of the contacts with a width of about 12 mm per set of contacts allows mounting an accessory set of contacts or other accessories next to the main set of contacts. In the event the magnetic drive evinces a characteristic curve as shown for the permanent-magnet forces in FIG. 13, the compression springs 25 of the movable contacts 21 may ensure monostable contactor behavior. If the coil is unenergized, the reaction form the springs 25 assists in detaching the armature 3, 4, that is in overcoming the negative portion of the permanent-magnet forces Pk.

FIG. 17 is a topview with partial sections of a magnetic drive similar to that of FIGS. 12 and 14, which in this case, instead of two coils, comprises four coils in the same direction and of which the cores (always of the same polarity) are connected outward to the external yoke 6 and inward to the annular pole-piece Rp. The circumference of the annular pole-piece Rp and one or both of the other pole pieces 4 are square and mostly about the same size. Four coil cores 2 are attached or mounted to the annular pole-piece Rp and bear the coils 1. The armature together with the permanent magnet 3 and the pole pieces 4 are displaceable perpendicularly to the plane of the drawing between the annular pole-piece Rp and the external yoke 6. Said armature cooperates magnetically with these parts which may be of one of the above designs.

The annular pole-piece Rp may be inside an injection-molded plastic so as to achieve mechanical guidance for the armature. Strips S may be formed from this injection molding and run parallel to the armature axis and serve as guides to the flat part of the pole piece 4.

The four or more coils also may be connected in crossed or Y manner, the periphery of the annular pole-piece Rp then being square. The result would be a more symmetrical distribution of the magnetic flux and the possibility to wind the four coils directly on the cross-shaped core with the annular pole-piece after each other, however the drive would be bulkier. Depending on space requirements or the drive excursion, two or more coils may be mounted by their axes perpendicularly to the plane of the annular pole-piece Rp, that is, parallel to the direction of excursion. The presence of several coils allows connecting these as needed in series or in parallel and thereby to make the magnetic drive operable at different voltages.

FIG. 18 shows a magnetic drive in particular for relays and of which the armature is guided with the assistance of a lamellar spring. The lamellar spring 31 is made of a non-magnetic material and is guided along the magnetic core 2 through the retention-means 10 (which simultaneously is the bobbin) and may rest in such a way on one of these parts that its elastically effective length changes in relation to the position of the armature 3,4. This feature may be deliberately introduced to match the drive characteristic curve to the requirement of a device to be powered, for instance to achieve monostable operation by storing energy. The retention-means 10, which at the same time serves as bobbin, is entered by the magnet core 2 comprising an annular pole-piece Rp. The lamination 31 may evince uneven width and is affixed at its left end, for instance together with the magnetic core, to the retention-means 10 or to the external yoke 6.

I claim:

1. A solenoid-operated mechanism comprising at least one lifting armature (3, 4, 4') magnetized in a direction corresponding to a path of movement of said lifting armature, said lifting armature (3, 4, 4') including one permanent magnet (3) and two soft magnetized pole pieces (4, 4'), said lifting armature (3, 4, 4') path of movement being coincident to a common axis between two spaced electromagnetic external poles (5, 5'), said electromagnetic external poles (5, 5') being of the same magnetic polarity, another electro-magnetic pole (1, 2, Rp) having a winding (1) wound on a magnetic core (2) and a ring pole (Rp) having an opening in which moves said permanent magnet (3) along said path of movement, wherein the axis of said winding, around which said winding is wound, is substantially perpendicular to said path of movement of said lifting armature, said permanent magnet (3) of said lifting armature (3, 4, 4') being constructed of a material having a minimum remanent induction Br of 0.7 T and an energy product BHmax reaching a minimum of 100 kJ/m$^3$, said permanent magnet (3) being substantially disc-shaped having a diameter, and an axis substantially coincident to said common axis, and said permanent magnet (3) having a maximum height measured in the direction of its axis which corresponds at most to substantially one-half of said diameter.

2. The solenoid-operated mechanism according to claim 1 wherein said soft magnetic pole pieces (4, 4') of the lifting armature (3, 4, 4') have a geometry on end portions facing the external poles (5, 5') which corresponds to the geometry of said external poles (5, 5') and the geometry of said soft magnetic pole pieces (4, 4') also correspond to the geometry of opposite circumferences of said opening of said ring pole (Rp) on a side facing said ring pole (Rp) ensuring that the magnetic reluctance of the magnetic paths between the permanent magnetic pole pieces (4, 4') and the electromagnetic external poles (5, 5') and/or the ring pole (Rp) is as low as possible thereby eliminating a direct magnetic connection between the external poles (5, 5') and the ring pole (Rp) due to the geometry of the magnetic pole pieces (4, 4'), the external poles (5, 5') and the ring pole (Rp).

3. The solenoid-operated mechanism according to claim 1 characterized in that at least one of the pole pieces (4, 4') extends radially beyond a circumference of the permanent magnet (3) and into a space between the external poles (5, 5') and the ring pole (Rp).

4. The solenoid-operated mechanism according to claim 1 characterized in that the geometry of the pole pieces (4, 4') is conical and substantially matches the geometry of at least one of the external poles (5, 5') and the opening of the ring pole (Rp).

5. The solenoid-operated mechanism according to claim 1 characterized in that the permanent magnet (3) and the pole pieces (4, 4') are enclosed by a thin non-magnetic sleeve (7).

6. The solenoid-operated mechanism according to claim 5 characterized in that said sleeve (7) is in external sliding guiding relationship to said external poles (5, 5').

7. The solenoid-operated mechanism according to claim 6 characterized in that means are provided for driving said sleeve (7).

8. The solenoid-operated mechanism according to claim 7 characterized in that said sleeve driving means is arranged in the immediate vicinity of the external poles (5, 5'), the pole pieces (4, 4') and the ring pole (Rp)
.

9. The solenoid-operated mechanism according to claim 1 wherein said lifting armature (3, 4, 4') is arranged within a floating ring pole-shaped opening of said ring pole (Rp).

10. The solenoid-operated mechanism according to claim 9 characterized in that said lifting armature (3, 4, 4') is used as one of a position indicator and for the manual operation of at least one other lifting armature.

11. The solenoid-operated mechanism according to claim 1 wherein a non-magnetic unit is fastened to the ring pole (Rp) for connection thereto of magnetic units including said external poles (5, 5') and a magnetic core (2).

12. The solenoid-operated mechanism according to claim 1 characterized in that at least one of said ring pole (Rp) and external poles (5, 5') comprise a stack of soft-magnetic metal sheets.

13. The solenoid-operated mechanism according to claim 1 characterized in that the stroke of the lifting armature (3, 4, 4') is controlled by electrical pulses of opposite polarity.

14. The solenoid-operated mechanism according to claim 1 characterized in that electrical pulses are created by at least one of charging and discharging a capacitor (30) associated with the winding (1).

15. The solenoid-operated mechanism according to claim 14 characterized in that the electrical pulses are triggered by the stroke position of the lifting armature (3, 4, 4') and controlled by at least one of mechanical switches (26), non-contact ranging sensors and the evaluation of changes in the magnetic field.

16. The solenoid-operated mechanism according to claim 14 including one of an electromechanical and electronic control unit (26, 32) characterized in that a supply voltage charges the pulse-generating capacity or affects the stroke of the lifting armature (3, 4, 4') and when disabling this voltage, the discharge of the capacitive charge in the winding (1) is initiated, causing the return of the lifting armature (3, 4, 4') to its starting position.

17. The solenoid-operated mechanism according to claim 1 including spring means for storing lifting energy in the vicinity between the external poles (5, 5') or the ring pole (Rp) and the lifting armature (3, 4, 4').

18. The solenoid-operated mechanism according to claim 1 characterized in that non-magnetic stops are arranged between the pole pieces (4, 4') and the external poles (5, 5') or the ring pole (Rp).

19. The solenoid-operated mechanism according to claim 1 characterized in that a fastening unit (10) designed as a compression cylinder is arranged between the external poles (5, 5') and the ring pole (Rp) in which the lifting armature (3, 4, 4') operates as a displacement piston by means of a seal (8) arranged on the pole piece (4, 4'), and at least one of the pole pieces (4, 4') includes a spring (13) to store lifting energy.

20. The solenoid-operated mechanism according to claim 1 characterized in that two cylinders are arranged between the external poles (5, 5') and the ring pole (Rp) in which the pole pieces (4, 4') of the lifting armature (3, 4, 4') function as displacement pistons.

21. The solenoid-operated mechanism according to claim 20 characterized in that one of displacement modules, diaphragms, bellows and seals are utilized in conjunction with said cylinders.

22. The solenoid-operated mechanism according to claim 1 characterized in that at least one valve chamber (15) is arranged around said ring pole (Rp) between the external poles (5, 5'), pressure ports in fluid communication with said valve chamber (15), said pressure ports being provided in the external poles (5, 5') and being shut off by means of valve units (14) of the pole pieces (4, 4') of the lifting armature (3, 4, 4'), the lifting armature (3, 4, 4') being enclosed in a non-magnetic guide sleeve (10) receiving said external poles (5, 5'), and said sleeve (10) including flow ports (o).

23. The solenoid-operated mechanism according to claim 1 including a non-magnetic fastening unit (10) to accommodate the ring pole (Rp) designed as a valve block including flow lines (P, A, B, R, S) in which at least one lifting armature (3, 4, 7) functioning as a valve slide is travelling, the pole pieces (4, 4') of which include openings for flow control.

24. The solenoid-operated mechanism according to claim 1 wherein said lifting armature (3, 4, 4') activates at least one valve slide, operating in a valve block including flow lines, which is integrated in an external pole (5).

25. The solenoid-operated mechanism according to claim 1 characterized in that the lifting armature (3, 4, 4') and at least one external pole (5) are rotating components of a drive train including connectable torque-transmitting discs (19, 20), said discs (19, 20) being jointly and axially displaceable together with the sleeve (7) of the lifting armature (3, 4), creating a non-slip contact with the rotating disc (20) or a stationary brake disc (24) and including units for the transmission of rotary movement (21, 22) attached to the lifting armature (3, 4, 7).

26. The solenoid-operated mechanism according to claim 1 characterized in that a sleeve (7) of the lifting armature (3, 4, 4') includes continuations to actuate floating contacts.

27. The solenoid-operated mechanism according to claim 1 characterized in that a fastening unit (10) serves as a support for one of electrical contacts and contact blocks.

28. The solenoid-operated mechanism according to claim 1 characterized in that the design of the lifting armature (3, 4, 4') allows travel across the axis of the winding (1).

29. The solenoid-operated mechanism according to claim 1 characterized in that several magnet cores (2) project from the ring pole (Rp) each supporting a winding (1), opposite extremities of the magnet cores (2) being of the same polarity, and said extremities project from the windings (1) opposite to the ring pole adjacent to the external yoke (6).

30. The solenoid-operating mechanism according to claim 29 characterized in that the air gaps in which the pole pieces (4, 4') are travelling are part of separately controlled magnetic circuits which are controlled electromagnetically independent from each other.

31. The solenoid-operated mechanism according to claim 1 characterized in that the pole pieces (4, 4') include voids based on matching minimum magnetic sections.

32. The solenoid-operated mechanism according to claim 1 characterized in that external poles (6) include openings larger than the circumference of the pole pieces (4, 4') acting opposite to them.

33. The solenoid-operated mechanism according to claim 1 characterized in that the section of openings in the ring pole (Rp) is not identical in the direction of the stroke and in cross direction to the same.

34. The solenoid-operated mechanism according to claim 1 characterized in that a face of ring pole openings change in height depending on their angular position around the stroke axis.

35. The solenoid-operated mechanism according to claim 1 characterized in that at least one of the ring pole (Rp) and the magnet cores (2) are spray-coated with a non-magnetic material to form a multi-function unit serving as a stroke guide, winding base and fastening device for other operational components.

36. The solenoid-operated mechanism according to claim 1 characterized in that short-circuit windings are arranged around one or several soft-magnetic components (2, 4, 5 and 6).

37. The solenoid-operated mechanism according to claim 1 characterized in that the direction of the axis of the windings (1) and/or the magnet cores (2) is arranged in a random angle to the direction of stroke.

38. The solenoid-operated mechanism according to claim 1 characterized in that the lifting armature (3, 4, 4') is attached to a multi-disc spring (31).

39. The solenoid-operated mechanism according to claim 38 characterized in that the multi-disc spring (31) is arranged along the magnet cores (2) and changes its effective elastic length by being progressively supported by the fixed units (2, 10), exerting its energy on the lifting armature (3, 4) depending on the stroke.

40. The solenoid-operating mechanism according to claim 1 characterized in that floating contacts (21) are arranged above each other along the stroke axis.

41. The solenoid-operated mechanism according to claim 1 characterized in that the operating direction of permanent-magnetic forces (Pk) changes over the stroke of the armature, with the negative and/or positive components of this force differing considerably.

42. The solenoid-operated mechanism according to claim 1 characterized in that the permanent-magnetic forces (Pk) are only acting in one direction over the stroke of the armature.

43. The solenoid-operated mechanism according to claim 1 including randomly controlled winding sections, characterized in that they include an inductance-capacitance winding (1).

* * * * *